United States Patent
Huang

(10) Patent No.: US 10,331,281 B2
(45) Date of Patent: Jun. 25, 2019

(54) METHOD FOR FILTERING TOUCH NOISE AND TOUCH DEVICE

(71) Applicant: EverDisplay Optronics (Shanghai) Limited, Shanghai (CN)

(72) Inventor: Feng-Shuen Huang, Shanghai (CN)

(73) Assignee: EverDisplay Optronics (Shanghai) Limited, Shanghai (CN)

( * ) Notice: Subject to any disclaimer, the term of this patent is extended or adjusted under 35 U.S.C. 154(b) by 230 days.

(21) Appl. No.: 15/360,299

(22) Filed: Nov. 23, 2016

(65) Prior Publication Data
US 2017/0308195 A1    Oct. 26, 2017

(30) Foreign Application Priority Data
Apr. 21, 2016    (CN) ............................ 2016 1 0250607

(51) Int. Cl.
  *G06F 3/041* (2006.01)
  *G06F 3/044* (2006.01)
(52) U.S. Cl.
  CPC ............ *G06F 3/044* (2013.01); *G06F 3/0418* (2013.01)
(58) Field of Classification Search
  CPC ................................ G06F 3/044; G06F 3/0418
  See application file for complete search history.

(56) References Cited

U.S. PATENT DOCUMENTS

| | | | | |
|---|---|---|---|---|
| 2010/0053097 A1* | 3/2010 | Goh | ...................... | G06F 3/0416 345/173 |
| 2011/0157069 A1* | 6/2011 | Zhuang | ................... | G06F 3/044 345/174 |
| 2012/0206407 A1* | 8/2012 | Taylor | ................... | G06F 3/0418 345/174 |
| 2014/0362033 A1* | 12/2014 | Mo | ....................... | G06F 3/0416 345/174 |
| 2016/0282991 A1* | 9/2016 | Wu | ......................... | G06F 3/044 |
| 2017/0205929 A1* | 7/2017 | Lee | ...................... | G06F 3/0414 |

* cited by examiner

*Primary Examiner* — Nitin Patel
*Assistant Examiner* — Amy Onyekaba
(74) *Attorney, Agent, or Firm* — Yunling Ren

(57) ABSTRACT

The present disclosure relates to a method for filtering touch noise and a touch device. The method includes: when normal signals for at least one row of the touch electrodes are input to the touch panel, obtaining a standard capacitance value of each of the touch electrodes, and obtaining a connection capacitance value of each of the touch electrodes; for each of the touch electrodes: subtracting a connection capacitance value of another touch electrode, which is in the same row with and adjacent to the touch electrode in a first direction, from the connection capacitance value of the touch electrode to obtain a capacitance difference value; from the last touch electrode, calculating the capacitance value of the restoration signal for each touch electrode along a second direction opposite to the first direction. Coordinates are calculated according to the capacitance values of the restoration signals for individual touch electrodes.

10 Claims, 7 Drawing Sheets

METHOD FOR FILTERING TOUCH NOISE AND TOUCH DEVICE

CROSS-REFERENCE TO RELATED APPLICATIONS

This application claims priority to Chinese Patent Application No. 201610250607.4, filed on Apr. 21, 2016, the entire contents of which are incorporated herein by reference.

TECHNICAL FIELD

The present disclosure generally relates to touch recognition, and more particularly to a method for filtering touch noise in a device in which a touch panel and a liquid crystal panel are integrated, and to a touch device.

BACKGROUND

Touch panels generally operate as follows. When a finger or other object touches a screen, voltage, current, acoustic waves or infrared rays are detected depending on different sensing manners so as to determine coordinates of the position where the touch point is located. For example, for a resistive touch panel, the position of a touch point is determined by calculating the position of the pressed point using a potential difference between upper and lower electrodes. For a capacitive touch panel, capacitive changes resulted from electrostatic contact between transparent electrodes and human body occur, and the coordinates of touch points are detected according to current or voltage generated due to the capacitive changes.

In old technologies, a capacitive touch panel is disposed on a liquid crystal panel. At present, integration of the capacitive touch panel and the liquid crystal panel has become more popular. The integration of the touch panel and the liquid crystal panel includes an "in-cell" method and a "on-cell" method. The "in-cell" method refers to that the touch panel function is embedded into the liquid crystal pixels. The "on-cell" method refers to embedding the touch panel function between a color filter substrate and a polarization sheet.

In the in-cell mode in which the touch panel and the liquid crystal panel are integrated, the capacitance of the touch panel is easily interfered by OLED circuits, and sometimes capacitance of electrodes associated with a whole string electrode can be raised a lot, and thus touch points cannot be identified accurately. The noise is resulted from the OLED display images. As shown in FIG. 1, a driving circuit 2' and a sensing circuit 3' are provided at periphery of a touch panel 1'. Driving lines 21' and sensing lines 31' are disposed on the touch panel 1', capacitors are provided between the driving lines and the sensing lines. The driving circuit 2' drives the driving lines on the touch panel 1', and the sensing circuit 3' senses signals of the sensing lines on the touch panel 1'. The conductive lines on the touch panel 1' which are connected with the driving circuit 2' and oriented in a first direction (X direction) are the driving lines 21', and the conductive lines on the touch panel 1' which are connected with the sensing circuit 3' and oriented in a second direction (Y direction) are the driving lines 31'. Capacitors are connected between the driving lines 21' and the sending lines 31'. During the former half of each period, the driving circuit 2' drives the conductive lines 21' oriented in the first direction, and the conductive lines 21' charge the capacitors using voltage. During the latter half of each period, the sensing circuit 3' senses the voltage on all of the conductive lines 31' oriented in the second direction to obtain n data. After m driving periods, m×n data can be obtained.

However, when a finger touches a position A on the touch panel 1', touch noise resulted from the interference of circuits occurs, and the sensing circuit 3' will sense a connection signal $L_i$ ($L_i=S_i+N_i$) including a normal signal $S_i$ and a noise signal $N_i$. Thus, sensing error occurs, thereby influence the sensing accuracy of the capacitive touch panel 1'.

In view of the above, inventors of the present disclosure provide a method for filtering touch noise and a touch device.

SUMMARY

Aiming at the drawbacks in conventional technologies, embodiments of the present disclosure provide a method for filtering touch noise and a touch device, which are capable of reducing the influence of noise on the touch panel and thereby improving sensing accuracy of the touch panel.

According to an aspect of embodiments of the present disclosure, there is provided a method for filtering touch noise, applied in a touch panel having a plurality of touch electrodes, wherein the method includes:

step 101: inputting normal signals for at least one row of the touch electrodes to the touch panel;

step 102: obtaining a standard capacitance value of each of the touch electrodes, and obtaining a connection capacitance value of each of the touch electrodes after the touch panel is affected by interference;

step 103: for each of the touch electrodes:

subtracting a connection capacitance value of another touch electrode, which is a succeeding touch electrode in the same row with the touch electrode and adjacent to the touch electrode along a first direction, from the connection capacitance value of the touch electrode to obtain a capacitance difference value of the touch electrode;

step 104: with the standard capacitance value of the last touch electrode in each row along the first direction under the normal signals as a capacitance value of a restoration signal, from the last touch electrode, calculating the capacitance value of the restoration signal for each touch electrode along a second direction which is opposite to the first direction, wherein the calculation of the capacitance value of the restoration signal comprises:

for each touch electrode:

adding the capacitance difference value of the touch electrode to a capacitance value of a restoration signal for another touch electrode which is a preceding touch electrode in the same row with the touch electrode and adjacent to the touch electrode along the second direction, so as to obtain the capacitance value of the restoration signal for the touch electrode.

Optionally, after step 104, the method further includes:

step 105: calculating coordinates according to the capacitance values of the restoration signal of individual touch electrodes.

Optionally, the first direction is from left to right, and the second direction is from right to left.

Optionally, the first direction is from right to left, and the second direction is from left to right.

Optionally, the touch panel is a capacitive touch panel.

According to another aspect of embodiments of the present disclosure, there is provided a touch device for implementing the above method for filtering touch noise, including:

a touch panel provided with driving lines and sensing lines between which capacitors are provided;

a driving circuit configured to drive the driving lines on the touch panel;

a sensing circuit configured to sense signals on the sensing lines on the touch panel; and a processing unit connected with the sensing circuit and configured to:

input normal signals for at least one row of the touch electrodes to the touch panel;

obtain a standard capacitance value of each of the touch electrodes, and obtain a connection capacitance value of each of the touch electrodes after the touch panel is affected by interference;

for each of the touch electrodes:

subtract a connection capacitance value of another touch electrode, which is a succeeding touch electrode in the same row with the touch electrode and adjacent to the touch electrode along a first direction, from the connection capacitance value of the touch electrode to obtain a capacitance difference value of the touch electrode;

with the standard capacitance value of the last touch electrode in each row along the first direction under the normal signals as a capacitance value of a restoration signal, from the last touch electrode, along a second direction which is opposite to the first direction, calculate the capacitance value of the restoration signal for each touch electrode, wherein the calculation of the capacitance value of the restoration signal comprises:

for each touch electrode:

adding the capacitance difference value of the touch electrode to a capacitance value of a restoration signal for another touch electrode which is a preceding touch electrode in the same row with the touch electrode and adjacent to the touch electrode along the second direction, so as to obtain the capacitance value of the restoration signal for the touch electrode.

Optionally, the processing unit is configured to:

calculate coordinates according to the capacitance values of the restoration signal of individual touch electrodes.

Optionally, the first direction is from left to right, and the second direction is from right to left.

Optionally, the first direction is from right to left, and the second direction is from left to right.

Optionally, the touch panel is a capacitive touch panel.

Optionally, the touch panel in the present disclosure can be applied in display devices such as OLEDs, LCDs, LEDs and the like to remove interference on the touch panel when the display devices display images.

The method for filtering touch noise and touch device provided by embodiments of the present disclosure can reduce the interference of noise on the touch panel and thereby improve sensing accuracy of the touch panel.

BRIEF DESCRIPTION OF THE DRAWINGS

The above and other features and advantages of the present disclosure will become clearer from the description of exemplary embodiments with reference to drawings.

REFERENCE SIGNS

1' touch panel
2' driving circuit
21' driving lines
3' sensing circuit
31' sensing lines
1 touch panel
2 driving circuit
21 driving lines
3 sensing circuit
31 sensing lines
4 processing unit
F First direction
A pressing position

DETAILED DESCRIPTION

Now, exemplary implementations will be described more comprehensively with reference to the accompanying drawings. However, the exemplary implementations may be carried out in various manners, and should not be interpreted as being limited to the implementations set forth herein; instead, providing these implementations will make the present disclosure more comprehensive and complete and will fully convey the conception of the exemplary implementations to the ordinary skills in this art. Throughout the drawings, the like reference numbers refer to the same or the like structures, and repeated descriptions will be omitted.

The features, structures or characteristics described herein may be combined in one or more embodiments in any suitable manner. In the following descriptions, many specific details are provided to facilitate sufficient understanding of the embodiments of the present disclosure. However, one of ordinary skills in this art will appreciate that the technical solutions in the present disclosure may be practiced without one or more of the specific details, or by employing other methods, components, materials and so on. In other conditions, well-known structures, materials or operations are not shown or described in detail so as to avoid confusion of respective aspects of the present disclosure.

Figure 1:
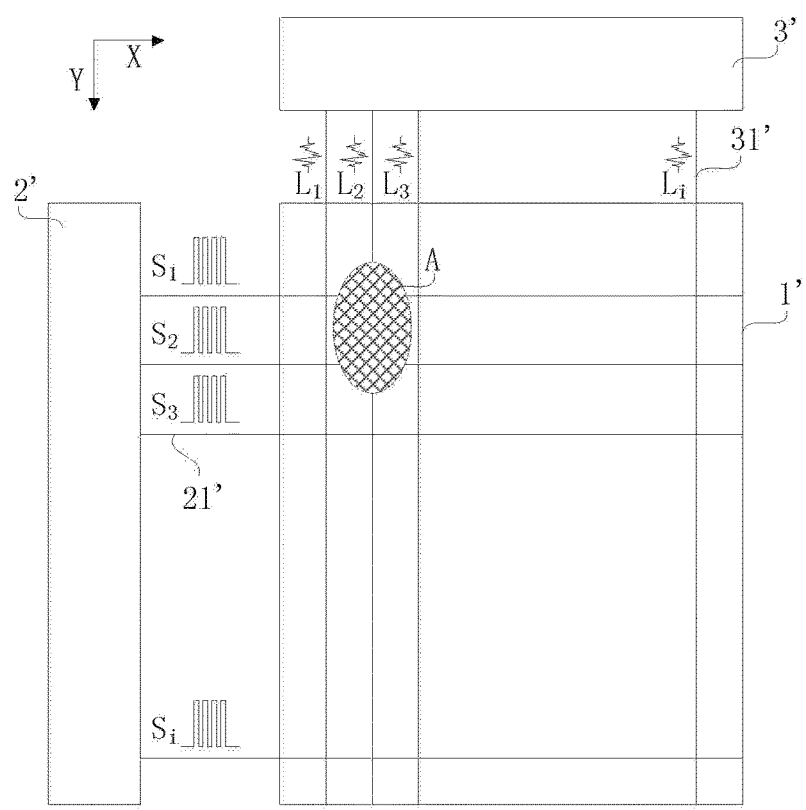
FIG. 1 is a schematic diagram showing connections between modules of a capacitive touch device in conventional technologies.
Figure 2:
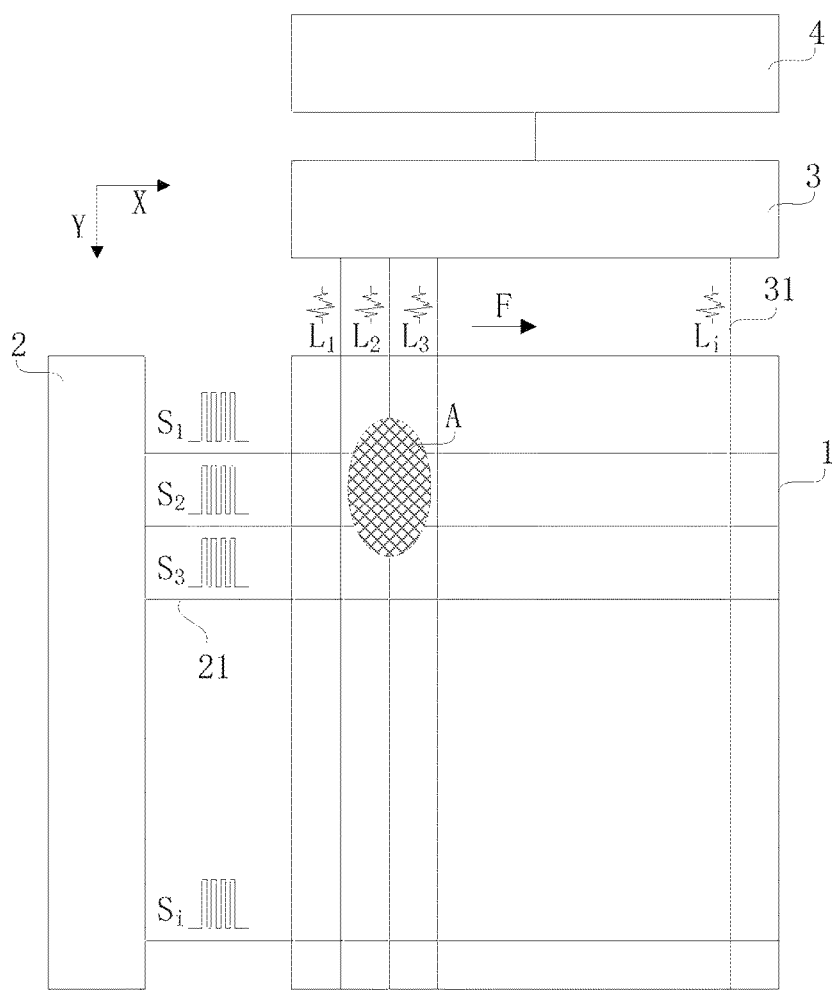
FIG. 2 is a schematic diagram showing connections between modules of a touch device according to an embodiment of the present disclosure.

FIG. 2 is a schematic diagram showing a touch device according to an embodiment of the present disclosure. As shown in FIG. 2, the touch device is configured to implement a method for filtering touch noise according to an embodiment of the present disclosure. The touch device includes a touch panel 1, a driving circuit 2, a sensing circuit 3 and a processing unit 4. The touch panel 1 includes a plurality of electrodes arranged in a matrix. In the embodiment, each of the electrodes is a capacitive touch electrode, and however the present disclosure is not limited to this. The driving circuit 2 and the sending circuit 3 are provided at periphery of the touch panel 1. The processing unit 4 is connected with the sensing circuit 3. The touch panel 1 is a capacitive touch panel. Driving lines 21 and sensing lines 31 are provided on the touch panel, and capacitors are provided between the driving lines 21 and the sensing lines 31. The driving circuit 2 is configured to drive the driving lines on the touch panel 1. The sensing circuit 3 is configured to sense signals of the sensing lines on the touch panel 1. The conductive lines on the touch panel 1 which are connected with the driving circuit 2 and oriented in a first direction (X direction) are the driving lines 21, and the conductive lines on the touch panel 1 which are connected with the sensing circuit 3 and oriented in a second direction (Y direction) are the driving lines 31. Capacitors are connected between the driving lines 21 and the sending lines 31. During the former half of each period, the driving circuit 2 drives the conductive lines 21 oriented in the first direction, and the conductive lines 21 charge the capacitors using voltage. During the latter half of each period, the sensing circuit 3 senses the voltage on all of the conductive lines 31 oriented in the second direction to obtain n data. After m driving periods, m×n data can be obtained. The processing unit is configured to: when normal signals for at least one row of the touch electrodes are input to the touch panel, obtain a standard capacitance value of each of the touch electrodes, and obtain a connection capacitance value of each of the touch electrodes after the touch panel is affected by interference; for each of the touch electrodes: subtract a connection capacitance value of another touch electrode, which is in the same row with the touch electrode and adjacent to the touch electrode in a first direction, from the connection capacitance value of the touch electrode to obtain a capacitance difference value of the touch electrode; take the standard capacitance value of the last touch electrode in each row along the first direction under the normal signals as a capacitance value of a restoration signal; from the last touch electrode, along a second direction which is opposite to the first direction, calculate the capacitance value of the restoration signal for each touch electrode, wherein the calculation of the capacitance value of the restoration signal comprises: for each touch electrode: adding the capacitance difference value of the touch electrode to the capacitance value of the restoration signal for another touch electrode which is in the same row with the touch electrode and adjacent to the touch electrode in the first direction, so as to obtain the capacitance value of the restoration signal for the touch electrode. Finally, the capacitance values of the restoration signal for individual touch electrodes are used for calculating coordinates. The touch panel can be a capacitive touch panel, and however the present disclosure is not limited to this.

The first direction can be from left to right, and the second direction can be from right to left, and however, the present disclosure is not limited to this. Alternatively, in other embodiments of the present disclosure, the first direction can be from right to left, and the second direction can be from left to right.

Figure 3:
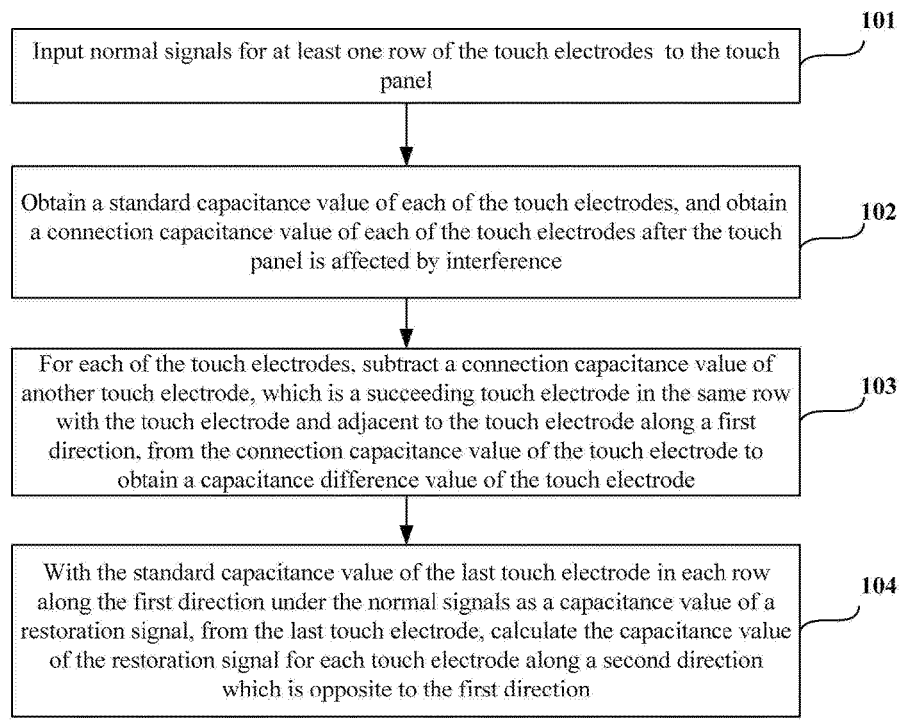
FIG. 3 is a flowchart showing a method for filtering touch noise according to an embodiment of the present disclosure.
Figure 4:
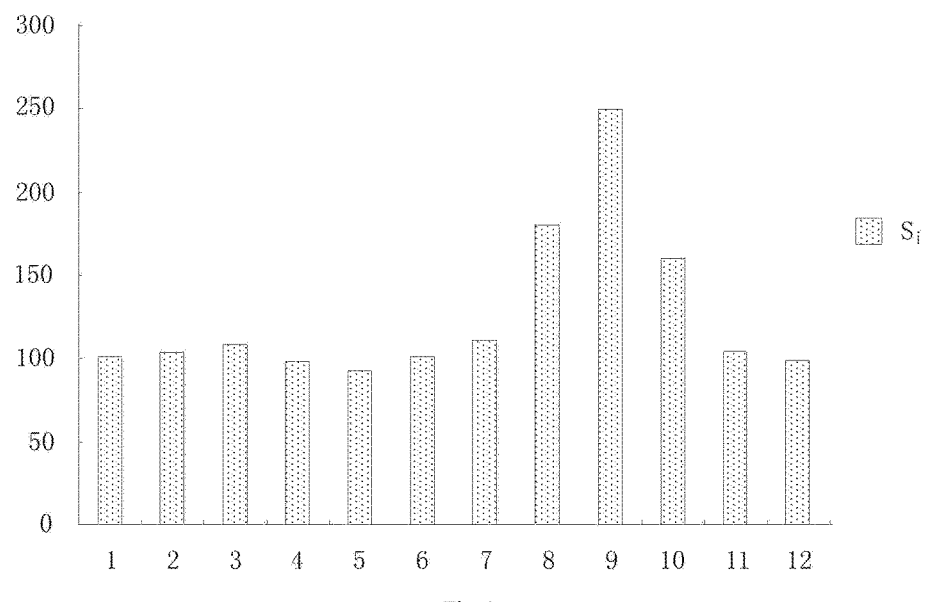
FIG. 4 is a bar graph showing standard capacitance values of touch electrodes when a touch panel is input with normal signals.
Figure 5:
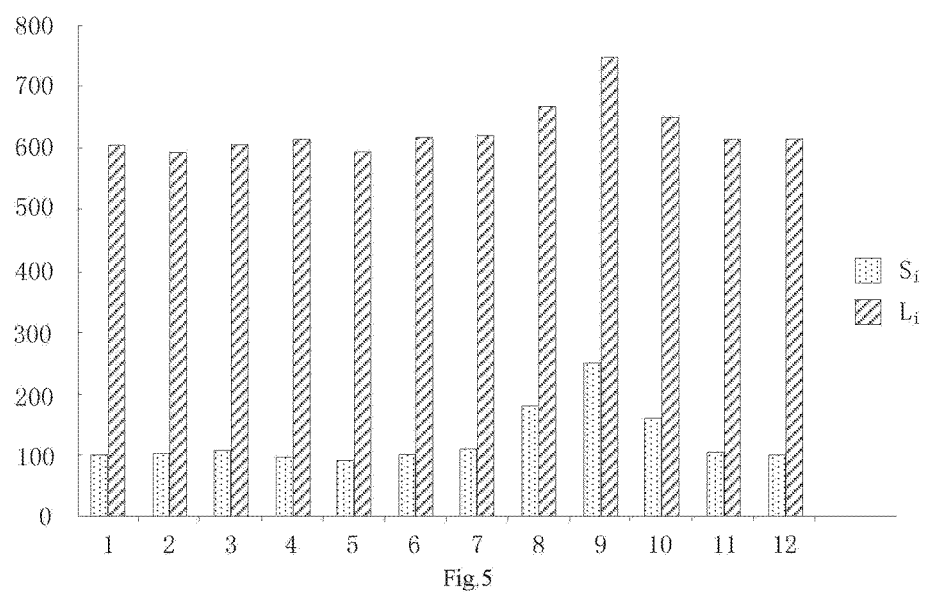
FIG. 5 is a bar graph showing standard capacitance values and connection capacitance values under interference of the touch electrodes, when the touch panel is input with normal signals.
Figure 6:
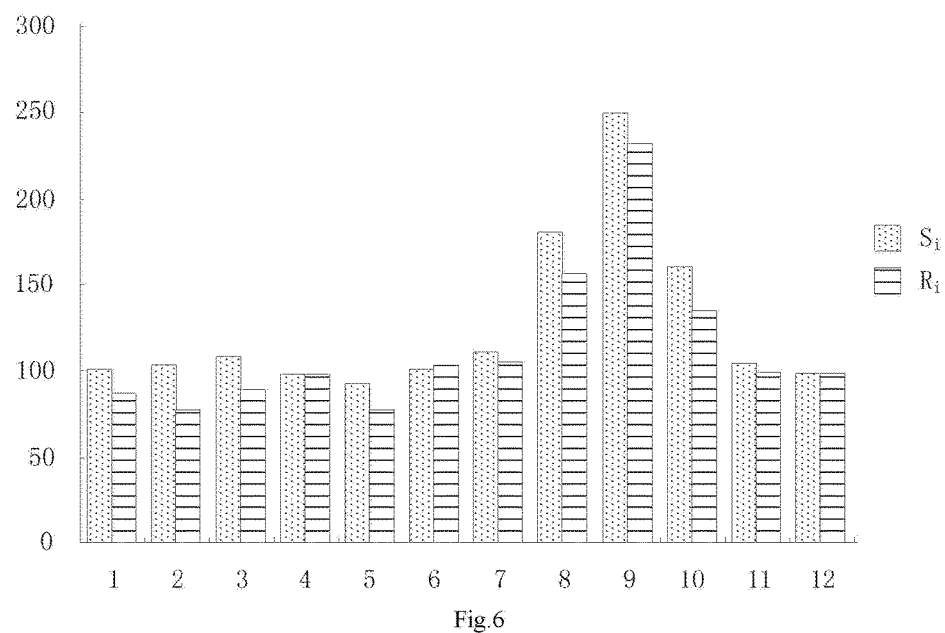
FIG. 6 is a bar graph showing standard capacitance values and capacitance values of restoration signals of the touch electrodes, when the touch panel is input with normal signals.

FIG. 3 is a flowchart showing a method for filtering touch noise according to an embodiment of the present disclosure. The method can be applied in a touch panel which can be a capacitive touch panel. The touch panel can have a plurality of touch electrodes. The method can include the following steps.

In step 101, normal signals for at least one row of the touch electrodes are input to the touch panel.

In step 102, a standard capacitance value of each of the touch electrodes is obtained, and a connection capacitance value of each of the touch electrodes after the touch panel is affected by interference is obtained.

In step 103, for each of the touch electrodes, a connection capacitance value of another touch electrode, which is a succeeding touch electrode in the same row with the touch electrode and adjacent to the touch electrode along a first direction, is subtracted from the connection capacitance value of the touch electrode to obtain a capacitance difference value of the touch electrode.

In step 104, with standard capacitance value of the last touch electrode in each row along the first direction under the normal signals is taken as a capacitance value of a restoration signal, from the last touch electrode, along a second direction which is opposite to the first direction, the capacitance value of the restoration signal for each touch electrode is calculated. Specifically, for each touch electrode, the capacitance difference value of the touch electrode is added to a capacitance value of a restoration signal for another touch electrode which is a preceding touch electrode in the same row with the touch electrode and adjacent to the touch electrode along the second direction, so as to obtain the capacitance value of the restoration signal for the touch electrode. The first direction F is from left to right, and the second direction is from right to left. However, the present disclosure is not limited to this.

Figure 7:
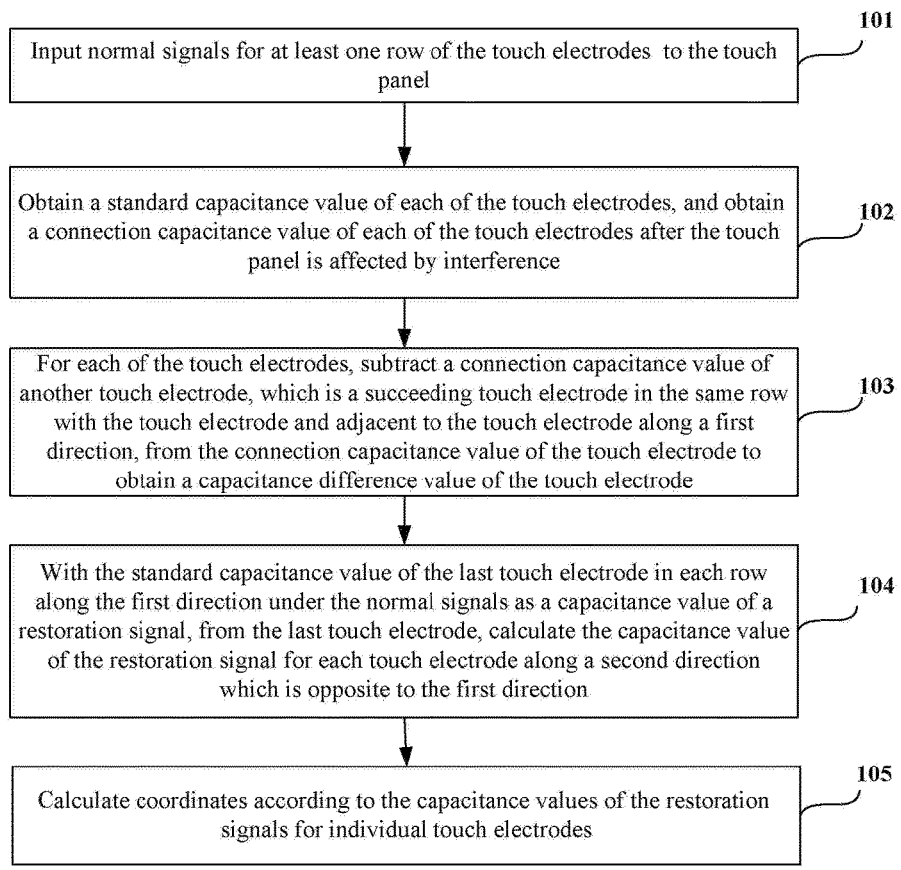
FIG. 7 is a flowchart showing a method for filtering touch noise according to another embodiment of the present disclosure.

Optionally, the method can further include step 105: calculating coordinates according to the capacitance values of the restoration signals for individual touch electrodes, as shown in FIG. 7.

In other embodiments of the present disclosure, the first direction can be from right to left, and the second direction can be from left to right. Under such condition, the leftmost can be taken as the origin in calculation of restoration signals, i.e., the restoration signal for each touch is calculated from left to right one by one.

One embodiment of the present disclosure can be as shown in the following Table 1:

TABLE 1

| | reference capacitance value | | | | | | | | | | | |
|---|---|---|---|---|---|---|---|---|---|---|---|---|
| Signal | 1 | 2 | 3 | 4 | 5 | 6 | 7 | 8 | 9 | 10 | 11 | 12 |
| Normal signal $S_i$ | 100 | 104 | 109 | 98 | 93 | 101 | 111 | 181 | 250 | 161 | 105 | 99 |

As shown in Table 1, which illustrates a row of twelve touch electrodes, standard reference capacitance values of individual touch electrodes when normal signals $S_i$ for at least one row of the touch electrodes are input to the touch panel are obtained. In embodiments of the present disclosure, the reference capacitance values are numerical values converted by a touch IC based on actual capacitance values, and this conversion depends on the capacity of the touch IC. For example, a touch IC takes 5 pF as a unit, and the number "1" represents that the detected capacitance is 0~4 pF, the number "2" represents that the detected capacitance is 5~9 pF, and so on. However, the present disclosure is not limited to this. In the following description, the meanings of the capacitance values are the same as described here, and repeated description will be omitted.

TABLE 2

| Signal | reference capacitance value | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Noise $N_i$ | 503 | 489 | 496 | 516 | 500 | 518 | 510 | 490 | 497 | 489 | 510 | 516 |
| Normal signal $S_i$ | 100 | 104 | 109 | 98 | 93 | 101 | 111 | 181 | 250 | 161 | 105 | 99 |
| Connection signal $L_i$ | 603 | 593 | 605 | 614 | 593 | 619 | 621 | 671 | 747 | 650 | 615 | 615 |

As shown in Table 2, connection capacitance values of individual touch electrodes after the touch panel is affected by interference are obtained. At this time, the connection signal $L_i$ equals to a sum of the reference capacitance value of the noise $N_i$ and the normal signal $S_i$, i.e., $L_i=S_i+N_i$. Specifically, the connection signals for individual touch electrodes are as follows:

$L_1=S_1+N_1=603;$ $L_2=S_2+N_2=593;$ $L_3=S_3+N_3=605;$ $L_4=S_4+N_4=614;$ $L_5=S_5+N_5=593;$ $L_6=S_6+N_6=619;$ $L_7=S_7+N_7=621;$ $L_8=S_8+N_8=671;$ $L_9=S_9+N_9=747;$ $L_{10}=S_{10}+N_{10}=650;$ $L_{11}=S_{11}+N_{11}=615;$ $L_{12}=S_{12}+N_{12}=615.$ with the touch electrode and right adjacent to the touch electrode, is subtracted from the reference connection capacitance value $L_i$ of the touch electrode to obtain a reference capacitance difference value of the touch electrode, i.e., $D_i=L_i-L_{i+1}$ (however, the touch electrode at the rightmost does not have a reference capacitance difference value). Specific calculations can be as follows:

$D_1=L_1-L_2=10;$ $D_2=L_2-L_3=-12;$ $D_3=L_3-L_4=-9;$ $D_4=L_4-L_5=21;$ $D_5=L_5-L_6=-26;$ $D_6=L_6-L_7=-2;$ $D_7=L_7-L_8=-50;$ $D_8=L_8-L_9=-76;$ $D_9=L_9-L_{10}=97;$ $D_{10}=L_{10}-L_{11}=35;$ $D_{11}=L_{11}-L_{12}=0;$

TABLE 3

| Signal | reference capacitance value | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Noise $N_i$ | 503 | 489 | 496 | 516 | 500 | 518 | 510 | 490 | 497 | 489 | 510 | 516 |
| Normal signal $S_i$ | 100 | 104 | 109 | 98 | 93 | 101 | 111 | 181 | 250 | 161 | 105 | 99 |
| Connection Signal $L_i$ | 603 | 593 | 605 | 614 | 593 | 619 | 621 | 671 | 747 | 650 | 615 | 615 |
| Reference capacitance difference $D_i$ | 10 | −12 | −9 | 21 | −26 | −2 | −50 | −76 | 97 | 35 | 0 | X |

As shown in Table 3, for each touch electrode, a reference connection capacitance value $L_{i+1}$ of another touch electrode, which is a succeeding touch electrode in the same row $D_{12}=X$ (the touch electrode at the rightmost does not have a reference capacitance difference value, and thus the value of $D_{12}$ cannot be calculated).

TABLE 4

| Signal | reference capacitance value | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Noise $N_i$ | 503 | 489 | 496 | 516 | 500 | 518 | 510 | 490 | 497 | 489 | 510 | 516 |
| Normal signal $S_i$ | 100 | 104 | 109 | 98 | 93 | 101 | 111 | 181 | 250 | 161 | 105 | 99 |
| Connection signal $L_i$ | 603 | 593 | 605 | 614 | 593 | 619 | 621 | 671 | 747 | 650 | 615 | 615 |
| Reference capacitance difference value $D_i$ | 10 | −12 | −9 | 21 | −26 | −2 | −50 | −76 | 97 | 35 | 0 | X |
| Restoration signal $R_i$ | 87 | 77 | 89 | 98 | 77 | 103 | 105 | 155 | 231 | 134 | 99 | 99 |

As shown in Table 4, the standard reference capacitance value of the last touch electrode along the direction from left to right under the normal signals Si is taken as a reference capacitance value of a restoration signal $R_i$, i.e., $R_{12}=S_{12}=99$.

From the last touch electrode, the reference capacitance value of the restoration signal $R_i$ for each touch electrode is calculated one by one. Specifically, for each touch electrode, the reference capacitance difference value $D_i$ of the touch electrode is added to the reference capacitance value of the restoration signal $R_{i+1}$ for another touch electrode which is a preceding touch electrode in the same row with the touch electrode and adjacent to the touch electrode along the second direction, i.e., $R_i=R_{i+1}+D_i$, so as to obtain the reference capacitance value of the restoration signal $R_i$ for the touch electrode. Specific calculations are as follows:

$$R_{11}=R_{12}+D_{11}=77;$$

$$R_{10}=R_{11}+D_{10}=87;$$

$$R_9=R_{10}+D_9=89;$$

$$R_8=R_9+D_8=77;$$

$$R_7=R_8+D_7=87;$$

$$R_6=R_7+D_6=89;$$

$$R_5=R_6+D_5=77;$$

$$R_4=R_5+D_4=87;$$

$$R_3=R_4+D_3=89;$$

$$R_2=R_3+D_2=77;$$

$$R_1=R_2+D_1=87.$$

Alternatively, the restoration signal $R_i$ can be represented as: $R_i=R_{i+1}+D_i=R_{i+1}+L_i-L_{i+1}=R_{i+1}+(S_i+N_i)-(S_{i+1}+N_{i+1})=R_{i+1}+(S_i-S_{i+1})+(N_i-N_{i+1})$. However the present disclosure is not limited to this.

Finally, coordinates can be calculated according to the reference capacitance values of the restoration signals $R_i$ for individual touch electrodes. Because the reference capacitance values of the restoration signals $R_i$ are less affected by interference, the technical solution in the present disclosure can reduce the influence of noise $N_i$ on the sensing accuracy of the touch panel.

In view of the above, the method for filtering touch noise and touch device in the present disclosure can reduce the influence of noise on the touch panel, thereby improving sensing accuracy of the touch panel.

The above detailed descriptions relate to some possible implementations of the present disclosure, and however they are not for limiting the protection scope of the present disclosure, and any equivalent implementations or modifications without departing the spirit of the present disclosure should fall within the protection scope of the present disclosure.

What is claimed is:

1. A method for filtering touch noise, applied in a touch panel having a plurality of touch electrodes, wherein the method comprises:
step 101: inputting signals for at least one row of the plurality of touch electrodes to the touch panel to enable the touch panel to work;
step 102: obtaining a reference capacitance value of each of the plurality of touch electrodes, and obtaining a connection capacitance value of each of the plurality of touch electrodes after the touch panel is affected by interference;
step 103: for each of the plurality of touch electrodes: subtracting a connection capacitance value of another touch electrode, which is a succeeding touch electrode in the same row with a current touch electrode and adjacent to the current touch electrode along a first direction, from the connection capacitance value of the current touch electrode to obtain a capacitance difference value of the current touch electrode;
step 104: with the reference capacitance value of the last touch electrode in each row along the first direction under the inputted signals as a capacitance value of a restoration signal, from the last touch electrode, calculating the capacitance value of the restoration signal for each touch electrode along a second direction which is opposite to the first direction, wherein the restoration signal for each touch electrode is a signal for restoring a capacitance value for each touch electrode in a case where the touch panel is affected by interference; wherein the calculation of the capacitance value of the restoration signal comprises: for each touch electrode: adding the capacitance difference value of the touch electrode to a capacitance value of a restoration signal for another touch electrode which is a preceding touch electrode in the same row with the touch electrode and adjacent to the touch electrode along the second direction, so as to obtain the capacitance value of the restoration signal for the touch electrode.

2. The method according to claim 1, wherein, after step 104, the method further comprises:
step 105: calculating coordinates according to the capacitance values of the restoration signals for individual touch electrodes.

3. The method according to claim 1, wherein the first direction is from left to right, and the second direction is from right to left.

4. The method according to claim 1, wherein the first direction is from right to left, and the second direction is from left to right.

5. The method according to claim 1, wherein the touch panel is a capacitive touch panel.

6. A touch device, comprising: a touch panel provided with driving lines and sensing lines between which capacitors are provided, wherein the touch panel has a plurality of touch electrodes;
a driving circuit configured to drive the driving lines on the touch panel;
a sensing circuit configured to sense signals on the sensing lines on the touch panel; and
a processor connected with the sensing circuit and configured to:
input signals for at least one row of the plurality of touch electrodes to the touch panel to enable the touch panel to work;
obtain a reference capacitance value of each of the plurality of touch electrodes, and obtain a connection capacitance value of each of the plurality of touch electrodes after the touch panel is affected by interference; for each of the touch electrodes:
subtract a connection capacitance value of another touch electrode, which is a succeeding touch electrode in the same row with a current the touch electrode and adjacent to the current touch electrode along a first direction, from the connection capacitance value of the current touch electrode to obtain a capacitance difference value of the current touch electrode; with the reference capacitance value of the last touch electrode in each row along the first direction under the inputted signals as a capacitance value of a restoration signal, from the last touch electrode, along a second direction which is opposite to the first direction, calculate the capacitance value of the restoration signal for each touch electrode, wherein the restoration signal for each touch electrode is a signal for restoring a capacitance value for each touch electrode in a case where the touch panel is affected by interference;

wherein the calculation of the capacitance value of the restoration signal comprises: for each touch electrode: adding the capacitance difference value of the touch electrode to a capacitance value of a restoration signal for another touch electrode which is a preceding touch electrode in the same row with the touch electrode and adjacent to the touch electrode along the second direction, so as to obtain the capacitance value of the restoration signal for the touch electrode.

7. The touch device according to claim 6, wherein the processor is configured to: calculate coordinates according to the capacitance values of the restoration signal for individual touch electrodes.

8. The touch device according to claim 6, wherein the first direction is from left to right, and the second direction is from right to left.

9. The touch device according to claim 6, wherein the first direction is from right to left, and the second direction is from left to right.

10. The touch device according to claim 6, wherein the touch panel is a capacitive touch panel.

* * * * *